June 27, 1939. A. C. LINDGREN 2,164,214
TILLING IMPLEMENT
Filed Dec. 20, 1937
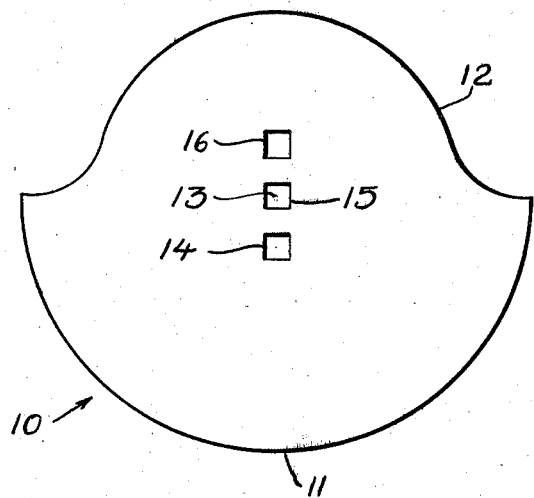
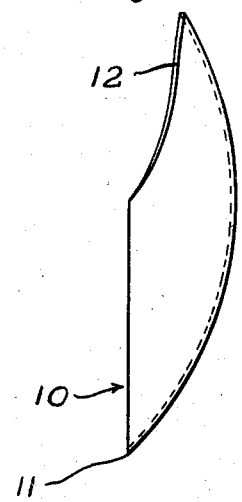
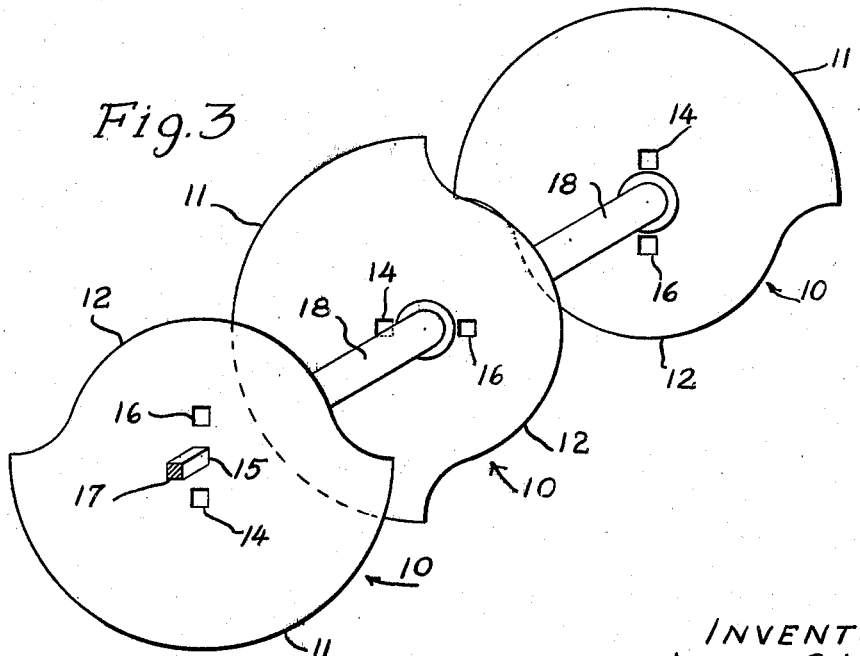
INVENTOR
ALEXUS C. LINDGREN
By *V. F. Lasasque*
ATT'Y Patented June 27, 1939

2,164,214

UNITED STATES PATENT OFFICE 2,164,214

TILLING IMPLEMENT

Alexus C. Lindgren, Chicago, Ill., assignor to International Harvester Company, a corporation of New Jersey Application December 20, 1937, Serial No. 180,679

14 Claims. (Cl. 97—217)

This invention relates to a soil tilling implement. More particularly it relates to a tilling element of the type especially adapted for use in semiarid areas for purposes of preparing the soil to utilize to the utmost the benefits of whatever meager precipitation or moisture may occur in the form of rain or snow. The invention is also useful in preparing any type of field in which it is desired to collect moisture in pits or basins formed in the field.

The principal object of the invention is to provide a rotatable tilling element of an improved type that may be utilized in obtaining desirable results in the uses mentioned above.

An important object is to provide a rotatable element having a plurality of cutting edges, which provide a series of pits in the soil as the element rotates.

Another object is to provide means in the element for mounting the element in a plurality of positions on a shaft for rotation therewith.

Still another object is to provide a rotatable tilling element that may be easily and inexpensively formed from an ordinary type of tillage disk.

Still another object is to provide a new and improved tilling element usable in a gang in a manner that will till the soil as in the ordinary disk harrow plowing procedure, but which will form a series of spaced pits or basins instead of a continuous furrow.

These and other desirable objects may be accomplished by one practicable form of the invention, as illustrated, in which the tilling element comprises a pair of substantially diametrically opposed arcuate cutting edges, one edge being farther from the mounting means for the shaft than the other.

A more complete understanding of the invention may be had from the following detailed description taken in conjunction with the accompanying sheet of drawings, in which:

Figure 1 is a face view of the element showing the cutting edges;

Figure 2 is an end elevational view of the same; and,

Figure 3 is an oblique perspective view illustrating the use of the tilling elements in a gang.

In a preferred embodiment of the invention, the tilling element comprises a member 10 which is formed with a pair of arcuate cutting edges 11 and 12. Each of these edges is substantially semi-circular in its extent, both edges being formed about substantially a common center, as at 13. It will be noted, however, that the edge 11 has a longer radius than the edge 12. This member or disk, as this type of element is commonly referred to, is easily and readily formed from an ordinary circular disk, as illustrated in Figure 2, although it may be formed originally for the purpose disclosed. The member or disk is provided with a series of spaced openings 14, 15 and 16, which lie substantially on the straight line bisecting the cutting edges 11 and 12, the opening 15 lying substantially on the aforesaid center 13.

The provision of these openings affords means for mounting the member on a shaft in a number of positions for the purpose of using the members in a gang, as best illustrated in Figure 3. A shaft 17, in this particular instance, is passed through the opening 15 in each disk 10, said disks being spaced on the shaft by any suitable spacing elements, as at 18. It will be apparent from an examination of Figure 3, that the elements may be arranged on the shaft in alternate angular positions with respect to each other and to the shaft. In other words, the first element has its larger cutting edge 11 disposed downwardly, the second element has the cutting edge 11 to the left and the third element has the cutting edge 11 at the top. It will be understood, of course, that additional elements will be successively positioned on the shaft 17; and it will be appreciated that the members 10 may be disposed on the shaft 17 in any manner which is found suitable and desirable.

As the gang, including the members 10, is drawn over the field, the cutting edges 11, being farther from the shaft mounting, will cut more deeply into the soil, this procedure being followed with regularity as forward movement of the gang continues. The shorter cutting edge 12 is useful in cutting the soil to a shallow depth and in cutting out weeds, etc.

The members 10 may be removed from the shaft 17 and replaced thereon in a manner utilizing the openings 16 instead of the openings 15. In this event, the cutting edges 11 are disposed still farther from the shaft 17 and deeper pits or basins will result. Similarly, the members may be mounted on the shaft by using the openings 14, in which the opposite cutting edges 11 and 12 are substantially equidistant from the shaft 17 and the gang becomes suitable for ordinary furrowing.

It will thus be seen that a new and improved tilling element has been provided which is usable in combination with similar elements for tilling the soil in a manner providing regularly spaced pits or basins. An important feature of the invention is the provision of the plurality of openings for mounting the members on a shaft in any of a plurality of positions for obtaining pits or basins of different depths. If the gang is operated at an angle to the line of draft, the widths of the pits or basins may also be varied according to the positions of the members on the shaft.

While only a preferred embodiment of the invention has been illustrated and described, it will be appreciated that numerous modifications and alterations may be made in the element without departing from the spirit and scope of the invention, as defined in the appended claims.

What is claimed is:

1. A tilling element adapted to be mounted on a shaft and comprising a member having a pair of diametrically opposed, semi-circular cutting edges, each edge being formed about substantially a common center and each having a radius of a different length, said member being provided with means for mounting the member on the shaft.

2. A tilling element adapted to be mounted on a shaft and comprising a member having a pair of arcuate cutting edges, said edges being disposed in substantially diametrically opposed relation and having radii of different lengths, said member being provided with a plurality of openings for mounting the member on the shaft in a plurality of positions.

3. A tilling element adapted to be mounted on a shaft and comprising a member having a pair of arcuate cutting edges formed about substantially a common center, each edge having a radius of a different length, said member being provided with a plurality of openings therein for mounting the member on a shaft in a plurality of positions.

4. A tilling element adapted to be mounted on a shaft and comprising a member having a pair of substantially arcuate cutting edges, said edges being disposed in substantially diametrically opposed relation and formed about substantially a common center, each edge having a radius of a different length, said member being provided with a plurality of openings for mounting the member on a shaft in a plurality of positions.

5. A tilling element adapted to be mounted on a shaft and comprising a member having a pair of substantially arcuate cutting edges, said edges being disposed in substantially diametrically opposed relation and formed about substantially a common center, each edge having a radius of a different length, said member being provided with a plurality of openings for mounting the member on a shaft in a plurality of positions, said openings lying substantially on the straight line which substantially bisects the arcuate edges.

6. A tilling element adapted to be mounted on a shaft and comprising a member having a pair of substantially arcuate cutting edges, said edges being disposed in substantially diametrically opposed relation and formed about substantially a common center, each edge having a radius of a different length, said member being provided with a plurality of openings for mounting the member on a shaft in a plurality of positions, said openings lying substantially on the straight line which substantially bisects the arcuate edges, one of said openings lying substantially on the aforesaid common center.

7. A tilling element adapted to be mounted on a shaft and comprising a member having a pair of arcuate cutting edges disposed in substantially diametrically opposed relation, said member being provided with at least a pair of openings for mounting the member on a shaft, one of said openings being closer to any point on one cutting edge than another opening is to any point on the other cutting edge.

8. A tilling element comprising a cut-away disk having an original semi-circular cutting edge and a second semi-circular cutting edge formed by the cut-away portion, said cutting edges being substantially diametrically opposed, said disk being provided with means for mounting the disk on a shaft.

9. A tilling element comprising a pair of diametrically opposed, semi-circular cutting edges, said edges having radii of different lengths, and each edge being formed about a center lying within the periphery of the element.

10. A tilling element adapted to be mounted on a shaft and comprising a member having a pair of semi-circular cutting edges, said edges being disposed in substantially diametrically opposed relation and formed about substantially a common center, the radius of one arcuate edge being shorter than the radius of the other edge, said member being provided with an opening for mounting the member on a shaft, said opening being nearer to any point on the cutting edge having the shorter radius than to any point on the other edge.

11. A tilling element adapted to be mounted on a shaft and comprising a member having a pair of arcuate cutting edges, said edges being disposed in substantially diametrically opposed relation and formed about substantially a common center, the radius of one arcuate edge being shorter than the radius of the other edge, said member being provided with a pair of openings for mounting the member on a shaft in either of two positions, both of said openings being nearer to any point on the cutting edge having the shorter radius than to any point on the other cutting edge.

12. A tilling element adapted to be mounted on a shaft and comprising a member having a pair of arcuate cutting edges, said edges being disposed in substantially diametrically opposed relation and formed about substantially a common center, the radius of one arcuate edge being shorter than the radius of the other edge, said member being provided with a plurality of openings for mounting the member on a shaft in any of a plurality of positions, at least two of said openings being nearer any point on the cutting edge having the shorter radius than to any point on the other cutting edge.

13. A tilling disk having two substantially semi-circular portions providing arcuate cutting edges, said portions having different radii.

14. A tilling disk having two substantially semi-circular portions providing arcuate cutting edges, said portions having different radii, said disks being formed with an opening therein on the straight line bisecting the semi-circular portions.

ALEXUS C. LINDGREN.